Dec. 2, 1958 A. CUZZI 2,862,238
INJECTION MOLDING MACHINES
Filed Sept. 7, 1955 2 Sheets-Sheet 1
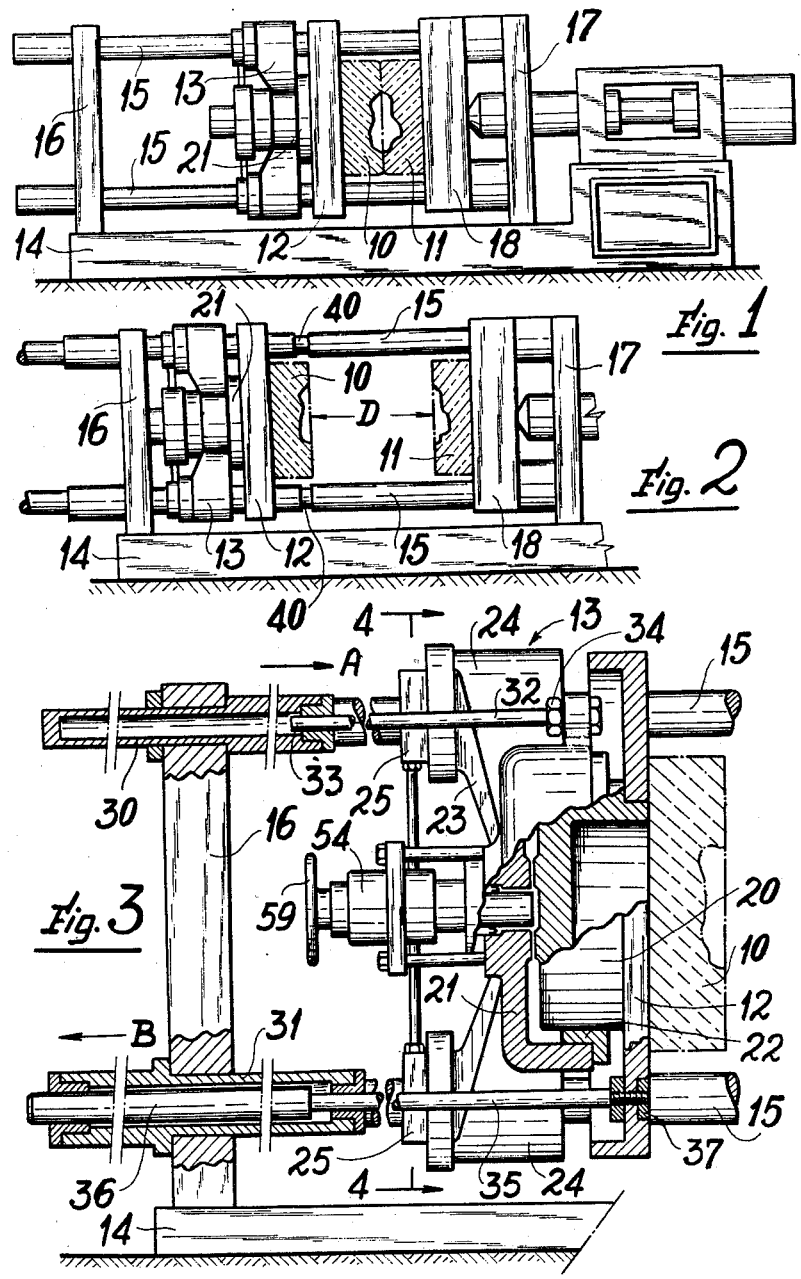

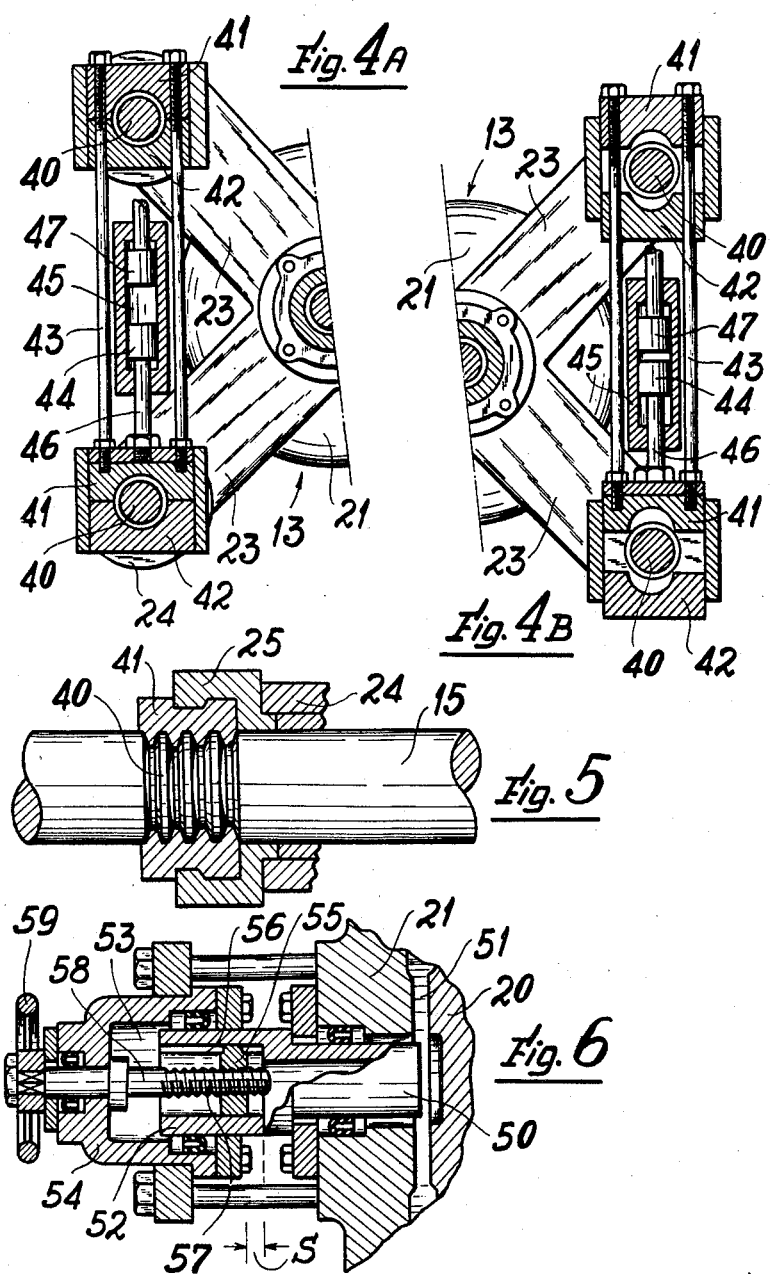

United States Patent Office 2,862,238
Patented Dec. 2, 1958

2,862,238

INJECTION MOLDING MACHINES

Alberto Cuzzi, Milan, Italy

Application September 7, 1955, Serial No. 532,955

Claims priority, application Italy May 12, 1955

5 Claims. (Cl. 18—30)

This invention relates to machines for injection molding or die casting of plastic, and more particularly it is related to new and improved molding machines capable of injection die casting of very big articles of thermoplastic material, between large sized die members which may be pressed together by powerful hydraulic means and that may be spaced apart at a remarkable interval, or spacing, for removing the produced article from the die.

It is known to those skilled in the art to which this invention appertains that in the conventionally constructed injection molding machines of the type referred to above the mold cavity or cavities is or respectively are formed between die elements, including at least a stationary die and a movable die. The stationary die is carried and removably secured to a bolster supported by the machine's bed, or frame structure. The movable die co-operates with the said stationary die and it is removably supported by and carried upon a die plate, which is supported on a ram that is reciprocated by an hydraulic motor which may comprise one or more pistons operating inside and through one or respectively more cylinders related thereto. In the most of the currently produced injection molding machines the said die plate is slidably supported by strain-rods for guiding movements thereof. The injection is generally performed in the mold cavity or cavities formed between the said stationary and movable dies through one or more passages formed through the said stationary die, and by means of suitable injection devices capable of injecting a "shot" of heated and plastified material inside said mold cavity or cavities, under high pressure. In view of the fact that this invention does not contemplate improvements in the injection means inclosed in the latter devices, the said devices will not be more fully analyzed nor described, and the current knowledge in the art can be applied for providing any improved die casting machine, which may be constructed according to this invention, with suitable injection devices.

It is further known that as a machine of the above type and character is big sized and capable of large production, in particular of producing big sized plastic articles, the required corresponding large sizing of the various structural and operative parts is subject to some objection and limitations, as hereinafter out-lined.

The amplitude of the dies makes it necessary the provision of very powerful hydraulic motors, capable of exerting on the die plate a pressure of several hundreds and sometimes of thousands of tons, i. e. the machine must be provided with one or more hydraulic piston or pistons of very large diameter, say of three, four and even more feet.

The provision of two or more pistons operating upon one die plate is subject to some objection too, in view of the difficulties in attaining the perfect balance of pressure and synchronism of movements in the several pistons.

The spacing at which the movable and the stationary die must be carried for removing the produced article or articles must be obviously related to the size of such article. For the best service of the injection molding machine, an oversized spacing capacity is most desirable. For making the machine capable to attain a such large spacing between the dies, when the mold is "open," very long pistons and cylinders must be provided in the machine. The large size, axial dimension and weight of the piston or pistons make the machine very costly and of difficult assembling and "mise au point" for operation. The weight of the long piston or pistons cannot be balanced on the slidable die plate and as said piston or pistons approach the position of mold "closed" a remarkable portion of said weight weighs down on the cylinder's stuffing.

In the most of big sized injection machines currently produced, the said powerful hydraulic system including the said cylinder or cylinders and the piston or pistons operating therein is made use of as "power means" only, for applying to the die plate the required high pressure, while the most of the amplitude of the movements of the said die plate, required for having the mold "open" and "closed," is due to the action of other hydraulic means, to which it will be referred as "motion means," including one or more other rams, or by using a portion only of the main power piston or pistons, constructed in two differing diameters at two axially aligned parts thereof. In any case, the piston or pistons included in the said "power means" are constructed to axially translate in respect to the cylinder or cylinders related thereto in a "stroke" motion corresponding to said spacing comprised between the said stationary and movable dies, when the mold is "open." A large amount of water is sucked in and exhausted from the cylinder or cylinders of the big power hydraulic system of the machine, as the mold thereof is closed and respectively open by the operation of the said motion means.

Other objections and negative factors of the practical construction and operation of injection molding machines of the major sizes are well known to those skilled in the art and, in general, it may be correctly assumed that the most of said drawbacks became actual as the stroke of the piston or pistons comprised in the power hydraulic means approaches to a certain practical amplitude.

It is the main object of this invention to provide a new and improved injection molding machine wherein the every co-operating members of the hydraulic power means, i. e. the piston or pistons connected to the die plate and designed to press the movable die against the stationary die, and the cylinder or the cylinders wherein the said piston or pistons operate, are movably supported in the frame structure of the machine, forming together a movable assembly which may be translated in respect to the said stationary die to have an at least substantial portion of the said spacing covered without relative movement of the said piston or pistons in respect to the said cylinder or cylinders, and wherein the said relative movement is made use of for applying the required pressure on the movable die, provided that said movable die is carried near to said stationary die by motion means designed to translate all the said elements of said assembly.

A more specific object of this invention is to provide a new and improved injection molding machine of the above type, comprising strain-rods along and on which the said die plate, connected to the piston or pistons comprised in the hydraulic power means, is slidably supported, wherein the cylinder or cylinders co-operating with the said piston or pistons in the said hydraulic power means are formed in a movable structural unit slidably supported on and along the said strain-rods too, and wherein locking means are provided to firmly securing the said unit to the said strain-rods at a position at which the said die plate is near to the position of "mold closed," for having the said cylinder or cylinders comprised in said unit re-acting on the said strain-rods as the said hydraulic power means is operated for pressing the said movable die against the said stationary die.

In an injection molding machine improved according to what above, preferably separate hydraulic motion means are provided for advancing and respectively for retreating the said assembly towards and respectively far from the position of "mold closed," the said motion means comprising at least one hydraulic motor connected to the said unit (comprising the cylinder or cylinders of the hydraulic power means) for forwarding the said assembly toward the position of "mold closed," and at least another hydraulic motor connected to the said die plate for retreating the said assembly towards the position of "mold open."

A further object of this invention is to provide, in an improved injection molding machine having the above disclosed features, locking means including a portion of the said strain-rods wherein a plurality of circular grooves are formed thereabout, and a clamping device including one or more pair or pluralities of co-operating clamp means connected to said movable assembly, and preferably to the said unit comprised therein, arranged about the said strain-rods and designed to be moved in interlocked relationship with the said grooves. Preferably the machine improved as above, according to the invention, is provided with further hydraulic means for operating the said clamping and locking device.

The generic and specific objects of this invention, together with these and other important features and advantages thereof and which will be made apparent as this description proceeds, will be more fully understood by a consideration of the following detailed disclosure of a preferred form of embodiment of the invention, as embodied in an injection molding machine of very big size, having hydraulic power means including one piston and one cylinder of very large diameter, reference being made to the accompanying drawings, forming an essential component of this disclosure, and wherein:

Figure 1 is a somewhat simplified side elevation of an injection molding machine produced according to the invention, of the above character, and in position of "mold closed";

Figure 2 is a like elevation of same machine, in the portion thereof including the features forming the essential characteristics of the invention, and in the position of "mold open";

Figure 3 shows, in larger scale and in a rather more detailed way, partly in vertical section and partly in side elevation, the movable assembly of the machine and the hydraulic motion means designed to reciprocate said assembly;

Figures 4A and 4B show a preferred form of embodiment of locking devices which may be usefully applied to a machine produced according to Fig. 3, said devices being shown in a rather simplified vertical sectional view, taken along the line 4—4 of Fig. 3, and in locked and respectively unlocked condition, in Figs. 4A and respectively 4B;

Figure 5 illustrates, in larger scale and in cross section, a detail of the portion of one of the strain-rods of the machine and of clamps co-operating therewith for locking the said unit to the said strain-rods; and Figure 6 illustrates, in larger scale and in vertical longitudinal sectional view, a preferred form of a pressure elevator and control means, which may be usefully applied to a machine produced and operated according to this invention.

In the accompanying drawings, like or equivalent parts are referred by like numerals throughout the several figures.

In said figures an injection molding machine of the so called "horizontal" type is shown. Although such type of machine is highly preferred in big ones, the invention is not intended to be limited to said type and, in certain cases, the various features that will be disclosed as this description proceeds, or one or more of said features, might advantageously be applied to die molding machines of type other than the one shown, say of vertical or inclined type.

Referring first to Figs. 1 and 2: in general and by taking into consideration the principal components of the machine only, an injection molding machine improved according to the invention is adapted to produce plastic articles by the injection of plasticized material into one or more mold cavity or cavities formed between a movable die 10 and a stationary die 11; of course, and according to current art, said dies may be formed by a plurality of relatively movable members, for the purpose of extraction of the produced article, for example, and the construction thereof is rather more complicated than the one disclosed. For the reason that the construction of the dies is not comprised in the features of the invention, the invention may be fully understood upon supposing that said dies are formed in the simplified shape and construction shown in the accompanying drawings.

The frame structure of the machine comprises, in general, a bed 14 having bolsters 16 and 17 secured thereto in spaced relationship, and a plurality of horizontal, parallel and spaced strain-rods 15 supported at their ends by said bolsters 16 and 17, and extended therebetween. The stationary die 11 is removably secured on one face of the stationary die plate 18 which is traversed by the passages (not shown) for injection of the plasticized material inside the mold cavity of cavities. The movable die 10 is removably secured to a die plate 12 slidably supported upon the said strain-rods 15 for guiding movements thereof. The said movable die plate 12 is connected to a ram which, according to conventional construction, is formed by the piston of an hydraulic power means capable to exert on said plate 12 the force of holding the said dies 11 and 10 together. The motion of said piston in respect with the cylinder in which said piston operates and wherein the hydraulic pressure is applied is allowed by the slidableness of said movable die plate 12 along said strain-rods 15.

In the cycle of operation of a machine for injection molding of plastic material the said dies 10 and 11 are relatively reciprocated from a position of "mold closed" (Fig. 1), wherein the said dies are in contacting and pressed relationship, to a position of "mold open" (Fig. 2), wherein a noticeable spacing D exists between said dies, for extraction of the produced article or articles, and vice-versa. As above said, the said die 11 is stationary in respect to machine's frame structure, and therefore the said movable die 10 and the movable die plate 12 supporting same are compelled to travel back and forth during said cycle of operation, performing movements of amplitude D.

As above out-lined, in injection molding machines of current construction the hydraulic power means, i. e. the piston or pistons and the cylinder or cylinders designed to apply the required pressure to hold the dies together, are axially dimensioned to admit a "stroke" of amplitude D of the said piston or pistons inside said cylinder or cylinders; the main drawbacks and objections caused by said condition have been considered above.

In the machine improved according to this invention, on the contrary, the cylinder means comprised in the said hydraulic power means, i. e. the cylinder or cylinders in which the piston or pistons connected to the movable die plate 12, are formed into an unit indicated in general by numeral 13 and which is slidably supported upon the frame structure and in particular upon the said strain-rods 15 and which may be reciprocated as a whole at the required amplitude of travel D for opening and closing the mold, without requiring any substantial relative movement of the piston means (connected to said movable plate 12) and of the cylinder means (formed in the said unit 13) of the hydraulic power means.

The machine improved according to the invention comprises further locking means adapted to temporarily securing the said assembly and in particular the said unit 13 to a determined point of its travel, say to the point 40 (Fig. 2) of the strain-rods, wherein the said assembly is positioned in relatively approached condition of the dies, i. e. the said unit 13 may be temporarily firmly connected to the machine's frame structure in a position at which the said movable die 10 is near to the stationary die 11.

Still further, the machine improved according to the invention comprises motion means, and preferably separate hydraulic means adapted to carry back and forth the said assembly formed by elements 12 and 13 along the said strain-rods 15 for an amplitude which is at least a substantial part of the amplitude D and corresponding to the travel from the position of "mold open" (Fig. 2) to the position at which the said unit 13 may be temporarily secured to the said strain-rods 15 at the point 40 thereof.

As a consequence of the above out-lined combination and arrangement of features, according to this invention, the cycle of operation of an injection molding machine improved according to the invention comprises the following steps, starting from the position of "mold open":

By operating the said motion means, the said assemly comprising the unit 13 and the movable die plate 12 is forwarded from the said starting position to a position wherein the movable die 10 is brought near to the stationary die 11 and wherein the said unit 13 may be secured to the strain-rods 15 at 40;

By operating the said locking means the said unit 13 is firmly secured to the said strain-rods 15;

By operating the hydraulic power means the movable die 10 is brought in contacting and pressed relationship against the said stationary die 11. In said step, the reaction of the pressure applied to the piston means comprised in the said power means, and supported by the related cylinder means, is transmitted to the frame structure through the said locking means securing the said unit 13 to the said strain-rods 15.

Having the said steps taken, the machine is put in condition of operation and the injection step of the plastified material into the mold cavity or cavities, formed between the said stationary and movable dies, pressed together, may take place. Upon completion of the said injection step:

The pressure in the cylinder means of the hydraulic power means is released; then By operating the said locking means the said unit 13 is un-locked from the said strain-rods; and then By operating the said motion means the said assembly 12, 13 is brought back in the position of "mold open," wherein the said movable die 10 is set at a spacing D from the stationary die 11 and wherein the produced article or articles might be extracted from the mold cavity or cavities.

As consequence of what above, the relative movement of the piston means in respect to the cylinder means, in the hydraulic power means of an injection molding machine improved according to the invention, may be confined within the little extent required to bring the said movable die in contacting and pressed relationship against the stationary die, provided that the said movably die has been already carried in a position very near to the said stationary die.

Upon the said provision, a machine of the type described and referred to above may be provided with and advantageously operated by making use of hydraulic power means including piston means and cylinder means of very little axial dimension and adapted to perform very short strokes.

Certain structural features which may be applied in the embodiment of the invention and the principal advantages which may be attained therefrom will be readily understood by a consideration of Figs. 3 to 5 inclusive, wherein the movable assembly, the power means and the motion means of a machine improved according to what above are shown.

In said machine, the hydraulic power means comprises a power piston 20 and a power cylinder 21. The said piston 20 is supported by the movable die plate 12 carrying the movable die 10. The cylinder 21 is provided with conventionally constructed and arranged stuffing means 22 where through the said piston can slide and it is formed in a structural body having braces 23 the end portions 24 of which embrace the said strain-rods 15 and are slidably supported thereon. The said body comprising the cylinder 21 and the means for slidably supporting same upon the strain-rods 15 constitutes said movable unit 13 and it is further provided with locking means 25 (Fig. 3) designed to temporarily lock and secured the said unit to the said strain-rods, i. e. to the machine's frame structure, at the desired point wherein the movable die 10 is well near to the stationary one.

In the preferred form of embodiment of the invention, shown in Fig. 3, the back and forth movements of the said assembly, comprising both the cylinder means and the piston means of the hydraulic power means, are obtained by making use of separate hydraulic motors, for example of an hydraulic motor 30 adapted to forward the said assembly in direction A towards the position of "mold closed" and an hydraulic motor 31 adapted to retreat the same assembly in direction B for having the machine set back in the position of "mold open," wherein the required ample spacing D exists between the movable and stationary dies 10 and 11, respectively. Said separate motion means will be hereinafter referred, in general, as "die closing motion means" and respectively as "die opening motion means."

In the preferred form of embodiment of Fig. 3, the said die closing motion means 30 comprises a pushing rod 32 made integral with a piston 33 operating into an hydraulic cylinder forming the body of said means 30, and firmly secured at 34 to the said movable unit 13. The said die opening motion means 31 on the contrary includes a pulling rod 35 made integral with an inverted piston 36 operating in the cylinder forming the body of said means 31 and firmly secured at 37 to the movable die plate 12. Preferably, the machine constructed according to the invention comprises two die closing motion means and two die opening motion means, each means being constructed substantially as above described and shown in the accompanying drawings, and the said several means are symmetrically arranged about the axis of power piston 20 and of power cylinder 21, for having the pushing and respectively the pulling actions, exerted thereby, balanced in respect the centre of load of the movable assembly.

For example, the said four motion means are positioned on the bolster 16 at the four corners thereof, near the strain-rods 15, and the die opening motion means and the die closing motion means are aligned on one and respectively on the other diagonal connecting said corners. For example, the die closing motion means 30 are positioned near the upper right corner and near the lower left corner of the bolster, where the die closing motion ones are positioned near the left upper and right lower corners, as shown.

An important advantage is obtained by the described connection of the said die closing motion means and of the said die opening motion means to the said unit 13 and respectively to the said slidable die supporting plate 12. Said advantage consists in the fact that, during the back and forth travels of the said slidable assembly, the unit 12 or 13 comprised therein, which during the travel is rearwardly positioned in respect to the direction of travel, is the driven unit, and said unit pushes ahead the other unit of the assembly. In fact, as the unit 13 is forwarded in direction A by the die closing motion means 30 secured at 34 thereto, it pushes ahead the unit 12 in same direction, and on the contrary in direction B the said unit 13 is thrust ahead by the unit 12, to which the said die opening motion means 31 is connected at 37. Said feature prevents any relative motion of piston 20 and of cylinder 21, and makes any mechanical connection between said units superfluous.

In Figs. 4A, 4B and 5 a preferred form of embodiment of means provided for locking the said unit 13 to the strain-rods 15 at 40 is shown. Any one of said strain-rods 15 is provided, at 40, with a plurality of circular grooves cut inside its cylindrical surface, as illustrated in Fig. 5, for example. In the outer end portions of the braces 23 of the unit 13 are slidably supported pairs of opposite clamp members 41 and 42 (Figs. 4A and 4B), each pair embracing one of said strain-rods 15, and having in-turned semicircular faces shaped to set into and to engage with the said grooved portion at 40 of the embraced strain-rod 15. The clamp members 41 and 42 of each pair are arranged in faced relationship, guidely supported in a plane at 90° in respect to the axis of the embraced strain-rod 15 and adapted to be moved from a clamping position about said strain-rod (Fig. 4A) to a spaced position at which said strain-rod is freed from engagement with said clamping members 41 and 42 (Fig. 4B), and vice-versa. The two clamping members 41 of two superimposed pairs are connected one to other by rods 43 and one of said members 41, say the one belonging to the lower pair, is further connected with a piston 44, by means of a connecting rod 46, for example. Said piston is movable and operating within an hydraulic cylinder 45, in opposition to a second piston 47 which is connected, by means of its own connecting rod (only partly shown), to one of the other clamping members 42, say to the one included in the upper pair, and the said members 42 are likewise connected one to other by means of rods (not shown) constructed and arranged as the said rods 43 are in respect to the clamp members 41, as above.

As a consequence of the described construction, supposing that the clamping devices are set in "open" or "free" position (Fig. 4B), by applying a suitable hydraulic pressure in the cylinder 45, the pistons 44 and 47 operating therein are caused to outwardly travel, thrusting the said clamp members 41 and 42 in locking position about and against the portion 40 of the respectively embraced strain-rod, thus making the said unit 13 firmly secured to said strain-rods and the machine adapted to perform the step of applying the required high hydraulic pressure within the power cylinder 21 for thrusting ahead the piston 20 to press the movable die 10 against the stationary die 11, and of injecting the plastified material within the mould cavity or cavities formed inside and between said dies. By applying the hydraulic pressure within the cylinders 45, on the outer faces of pistons 44 and 47, the same clamping and locking devices may be open, making the said unit 13 free for movement along the strain-rods 15.

The big and powerful injection molding machines improved according to this invention, owing to the great amount of water required for the operation of the hydraulic power means thereof and the very favourable ratio between the said amount and the diameter of the power piston (due to the small stroke and length of the piston-cylinder power system, made possible by the above considered features of the invention), may be advantageously provided with a new and improved adjustable pressure elevator, of the type shown in detail in Fig. 6. Said pressure elevator is designed for applying in the interior 51 (Fig. 6) of the cylinder 21 a pressure greater than the hydraulic pressure supplied to the machine by the conventional means (not shown) connected to the machine to supply same with pressurized water, and for adjusting, within certain large limits, the ratio between the applied and the supplied pressures, i. e. for varying at will the value of the applied pressure, provided that the water is fed into the machine at a given hydraulic pressure.

The said pressure elevator includes a two-diameters piston having a portion 50 of smaller diameter, operating through the wall of the power cylinder 21 on the interior 51 of the machine's power means and a portion 52, coaxial to said portion 50, operating in the interior 53 of a small auxiliary cylinder 54, firmly secured to said main power cylinder 21. The said two-diameters piston 50, 52 is freely movable (within certain limits as fully explained above) along the axis of an opening provided in the said power cylinder's wall and of the said auxiliary small cylinder 54. Suitable packing-rings of conventional construction are fitted about portions 50 and 52 of the said piston, and set inside the said opening and the said small cylinder 54, respectively. The said smaller portion 50 and the said greater portion 52 (in relation to the diameters thereof) of said two-diameters piston are therefore subject to the pressure existing in the said power cylinder 21 and respectively to the pressure existing in the said small auxiliary cylinder 54. The interior 53 of said small auxiliary cylinder 54 is connected to the pressurized water feeding system (not shown) connected to the various hydraulic other power, motion and service means of the machine, by means of suitable conventional pipings and check valve means (not shown).

Owing to the differing diameters of the two portions 50 and 52 of said piston, a given fixed ratio exists between the respective cross-sectional areas thereof. The said two-diameters piston 50, 52 will be longitudinally balanced, i. e. a like axial thrust will be applied to both ends of said piston as in the interiors 51 and 53 of power cylinders 21 and of small auxiliary cylinder 54, respectively, there will be applied pressures related one to other as a function of the inverse of said ratio of said cross-sectional areas. Supposing that in the interior 51 of said power cylinder 21 the given hydraulic supply pressure have been applied, by connecting said interior 51 to the pressurized water supply, feeding the machine, the said two-diameters piston will be thrust towards and into the said small auxiliary cylinder, as far as the parts thereof abut. Supposing now that same given pressure is then applied within the interior 53 of small cylinder 54, by opening the check valve (not shown) and feeding pressurized water therein, the said given pressure, applied on the major cross-sectional surface of portion 52, will exert on the piston an axial thrust which will move same piston towards the interior 51 of power cylinder 21, overcoming the opposite axial thrust that the same pressure, in the said interior 51, may apply on the minor cross-sectional surface of portion 50. Upon closing of the check valve (not shown) through which the said interior 51 communicates with the pressurized water supply, the pressure of water inside the said interior 51 of the power cylinder will be elevated up to a new value which is related to the said given pressure according to the said ratio of cross-sectional areas, provided that the possible free stroke of the said two-diameters piston will allow the corresponding compression of water inside said interior 51. Let us assume, for example, that said cross-sectional areas of portions 50 and 52 are related one to other according to a 3/1 ratio, the described pressure elevator might apply into the power cylinder 21 of the machine a working pressure threefold than the given pressure supplied in the machine.

Owing to the remarkable amount of water which may be fed inside the interior 51 of the power cylinder (from 5 to 20 or more gallons, for example, in big sized machines produced according to the invention) and the high hydraulic pressures that conventional supply plants may feed into injection molding machines (from 40 to 60 or even more lbs./sq. in.), the contraction of the compressed water will reach a volumetrically noticeable value, which is clearly readable as a function of the axial travel of said two-diameters piston 50, 52. The pressure elevator considered and shown in Fig. 6 comprises means designed to confine within given variable limits the amplitude of axial free travel of said piston, in view of controlling at will the pressure effectively applied within the power cylinder, in relation to the given supplied pressure, by volumetrically controlling the contraction of water inside the said power cylinder of the machine.

In view of what above, the pressure elevator is provided with a stop member 55 arranged inside the major portion 52 of said two-diameters piston, and rotatively but not axially connected thereto, by means of a longitudinal groove 56 cut in the inner surface of said portion 52, for example. The said stop member is screwly engaged with a threaded portion 57 of a shaft 58, co-axial to said piston, rotatably supported through and axially connected to the head portion of said small auxiliary cylinder 54 and secured, at its end portion outer to said small cylinder, to handle means adapted to rotate said shaft, say to an hand-wheel 59. The said two-diameters cylinder 50, 52 is provided with inner and outer shoulders (illustrated in Fig. 6) arranged to axially abut against to said stop member and respectively against a shoulder formed by a part connected to or made integral with the said power cylinder 21. As consequence of what above, by properly controlling the said pressure elevator, say by handling the said hand-wheel 59, it is possible to modify at will the amplitude of the axial free travel of the two-diameters piston, and therefore the value of the pressure that may effectively applied to the power piston 20, at any desired value comprised between a lower limit, which may correspond to the given pressure supplied (by preventing any axial movement of the two-diameters piston) and an upper limit, which may be related to said given supplied pressure by the said ratio of cross-sectional surfaces (by allowing the said piston to freely run a stroke at least corresponding to the one necessary for causing the water to correspondingly contract).

It will be understood that each of the elements of this new and improved injection molding machine, as described above, or two or more together, may also find useful application in other types of injection molding machines for like or equivalent productions, differing from the one described.

While I have described and illustrated my invention but in one form of embodiment thereof, and more particularly as embodied in an injection molding machine of the horizontal type and including power means having but one power cylinder and one piston operating therein, I do not intend to be limited to the details shown, since various modifications, adaptations and structural changes may be made without departing in any way from the spirit of my invention.

For example, while hydraulic means have been disclosed for operating the locking devices designed to secure the unit 13 to the strain-rods 15, mechanical, electrical, pneumatic or other types of control means might be provided therefor, and to control locking means differing from the ones disclosed, easily conceivable by those skilled in the art by applying current knowledge. Further, the said locking devices might be arranged for securing the said unit to parts of the frame structure, differing from the strain-rods, say to the bed of the machine. Still further, motion means of not hydraulic type, say of mechanical character, might be made use for causing the said assembly to travel back and forth in view of spacing and narrowing the die supporting elements without relative movement of the components of the machine's power means, according to the gist of this invention, or at least for moving the said assembly along a path of amplitude covering a substantial part of the whole desired spacing D existing between the dies in position of "mold open."

Without further analysis, the foregoing will so fully reveal the gist of this invention that other can, by applying current knowledge, readily adapt it for various applications without omitting features that, from the standpoint of prior art, fairly constitute essential characteristics of the generic and/or specific aspects of this invention and, therefore, such adaptations should and are intended to be comprehended within the spirit and range of equivalent of this invention, as defined in and by the appended claims.

Having thus described and made clear this my invention, and the mode of making use thereof, what I claim as new and desire to have protected by Letters Patent is:

1. An injection molding machine comprising, in combination, a supporting frame including a plurality of parallel tie rods; a stationary die plate supported on said frame; a movable assembly including a power cylinder means movably supported on said tie rods and having a closed end and an open end facing toward said stationary die plate, a power piston means movably mounted in said power cylinder means and projecting from said open end, and a die plate fixedly secured to said power piston means and movably supported on said tie rods, said movable die plate being located opposite said stationary die plate; hydraulic moving means including stationary means secured to said frame and reciprocable means secured to said movable assembly whereby said assembly can be moved between a retracted position and an advanced position in which said die plates are closely spaced from each other; and hydraulically operated clamping means for clamping said power cylinder means in said advanced position of said assembly to said tie rods so that pressure fluid introduced into said power cylinder means further advances said power piston means whereby said movable die plate is pressed against said stationary die plate.

2. An injection molding machine comprising, in combination, a supporting frame including a plurality of parallel tie rods; a stationary die plate supported on said frame; a movable assembly including a power cylinder means movably supported on said tie rods and having a closed end and an open end facing toward said stationary die plate, a power piston means movably mounted in said power cylinder and projecting from said open end, and a die plate fixedly secured to said power piston means and movably supported on said tie rods, said movable die plate being located opposite said stationary die plate; hydraulic moving means including first cylinder means and second cylinder means secured to said frame, first piston means movably mounted in said first cylinder means and second piston means movably mounted in said second cylinder means, first connecting rod means connecting said first piston means with said power cylinder means, and second connecting rod means connecting said second piston means with said movable die plate whereby said assembly can be moved by said first cylinder and piston means to an advanced position with said power cylinder means pushing said movable die plate through said power piston means, and can be moved by said second piston means to a retracted position with said movable die plate pushing said power cylinder means through said power piston means, said die plates being closely spaced from each other in said advanced position of said assembly; and hydraulically operated clamping means for clamping said power cylinder means in said advanced position of said assembly to said tie rods so that pressure fluid introduced into said power cylinder means further advances said power piston means whereby said movable die plate is pressed against said stationary die plate.

3. An injection molding machine as set forth in claim 2 wherein said frame includes header plates connected by said tie rods, one of said header plates being fixedly connected to said stationary die plate; and wherein said first and second cylinder means of said hydraulic moving means each include two cylinders arranged in diagonally opposite corners of the other header plate, and wherein said first and second reciprocable piston means each include two pistons, said pistons being mounted in the respective cylinders in such a manner that introduction of pressure fluid into said first cylinder means effects movement of said first piston means in a direction toward said one header plate, and introduction of pressure fluid into said second cylinder means effects movement of said second piston means away from said one header plate.

4. An injection molding machine as set forth in claim 1 wherein each of said tie rods has a recessed portion, and wherein said hydraulic clamping means include a plurality of clamping jaw means, and hydraulic piston and cylinder means for operating said clamping jaw means to clamp said recessed portions of said tie rods in said advanced position of said assembly.

5. Injection molding machine as set forth in claim 1 and including a pressure boster device, said pressure booster device comprising a cylinder; a piston having a portion of greater diameter slidably mounted in said cylinder and a portion of smaller diameter, a nut member connected to said piston non-rotatable and movable in axial direction, a threaded spindle threadedly engaging said nut member and being mounted in said cylinder turnable and non-movable in axial direction, and manually operated means for turning said spindle; said power cylinder means being formed with a bore passing therethrough at said closed end thereof, said portion of smaller diameter of said piston passing through said bore whereby the pressure in said power cylinder means can be adjusted by operation of said manually operated means when pressure fluid is applied to said power cylinder means and to said cylinder of said pressure booster means.

References Cited in the file of this patent

UNITED STATES PATENTS

| | | |
|---|---|---|
| 2,355,613 | Wacker | Aug. 15, 1944 |
| 2,465,204 | Dalton | Mar. 22, 1949 |
| 2,689,978 | Roger | Sept. 28, 1954 |
| 2,711,561 | Studli | June 28, 1955 |
| 2,718,663 | Roger | Sept. 27, 1955 |